United States Patent
Choi

(12) United States Patent     (10) Patent No.: US 7,999,909 B2
(45) Date of Patent: Aug. 16, 2011

(54) FABRICATION METHOD OF IN-PLANE SWITCHING MODE LIQUID CRYSTAL DISPLAY DEVICE INCLUDING TWISTED NEMATIC LIQUID CRYSTAL LAYER BETWEEN FIRST AND SECOND FERROELECTRIC LIQUID CRYSTAL LAYERS

(75) Inventor: Su-Seok Choi, Gyeonggi-do (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 12/841,734

(22) Filed: Jul. 22, 2010

(65) Prior Publication Data
US 2010/0285613 A1    Nov. 11, 2010

Related U.S. Application Data

(62) Division of application No. 11/159,300, filed on Jun. 23, 2005, now Pat. No. 7,787,088.

(30) Foreign Application Priority Data

Dec. 30, 2004    (KR) ........................ 10-2004-0116598

(51) Int. Cl.
    *G02F 1/1337*      (2006.01)
    *G02F 1/141*       (2006.01)
    *G02F 1/1343*      (2006.01)
    *C09K 19/02*      (2006.01)

(52) U.S. Cl. ........ 349/191; 349/128; 349/133; 349/141; 349/172; 349/179

(58) Field of Classification Search .................. 349/128, 349/133, 141, 172, 179, 187, 191; 438/30
See application file for complete search history.

(56) References Cited

U.S. PATENT DOCUMENTS

| | | | |
|---|---|---|---|
| 5,009,489 A | 4/1991 | Eguchi et al. | |
| 5,317,429 A | 5/1994 | Mochizuki et al. | |
| 5,808,716 A | 9/1998 | Gass et al. | |
| 5,844,652 A | 12/1998 | Takatori | |
| 5,850,273 A * | 12/1998 | Terashita et al. | 349/129 |
| 6,175,401 B1 | 1/2001 | Tanaka et al. | |
| 6,417,907 B2 | 7/2002 | Choi et al. | |
| 6,549,255 B2 | 4/2003 | Stebler et al. | |

(Continued)

FOREIGN PATENT DOCUMENTS

JP     2002-520652     7/2002

(Continued)

*Primary Examiner* — Brian M. Healy
*Assistant Examiner* — Paisley L Arendt
(74) *Attorney, Agent, or Firm* — McKenna Long & Aldridge LLP

(57) ABSTRACT

An in-plane switching mode liquid crystal display device includes a first substrate including a pixel electrode in a pixel region, a second substrate facing the first substrate and including a common electrode, a first alignment layer on the pixel electrode, a second alignment layer on the common electrode, a first ferroelectric liquid crystal layer on the first alignment layer and including a first spontaneous polarization, a second ferroelectric liquid crystal layer on the second alignment layer and including a second spontaneous polarization, a rotational direction of the first ferroelectric liquid crystal layer with respect to the first alignment layer being different from a rotational direction of the second ferroelectric liquid crystal layer with respect to the second alignment layer, and a twisted nematic liquid crystal layer between the first and second ferroelectric liquid crystal layers.

9 Claims, 8 Drawing Sheets

U.S. PATENT DOCUMENTS

| | | |
|---|---|---|
| 6,700,558 B1 | 3/2004 | Itoh |
| 2001/0005249 A1 | 6/2001 | Stebler et al. |
| 2001/0022642 A1 | 9/2001 | Yoo et al. |
| 2003/0203130 A1 | 10/2003 | Geisow et al. |
| 2004/0057001 A1 | 3/2004 | Kim |
| 2004/0070699 A1 | 4/2004 | Miyachi et al. |
| 2005/0179855 A1 | 8/2005 | Helgee et al. |

FOREIGN PATENT DOCUMENTS

| | | |
|---|---|---|
| JP | 2004-133096 | 4/2004 |
| KR | 10-2004-0093173 | 11/2004 |
| WO | WO 00/03288 | 1/2000 |

* cited by examiner

FABRICATION METHOD OF IN-PLANE SWITCHING MODE LIQUID CRYSTAL DISPLAY DEVICE INCLUDING TWISTED NEMATIC LIQUID CRYSTAL LAYER BETWEEN FIRST AND SECOND FERROELECTRIC LIQUID CRYSTAL LAYERS

CROSS-REFERENCE TO RELATED APPLICATIONS

This application is a Divisional of application Ser. No. 11,159,300, filed Jun. 23, 2005 now U.S. Pat. No. 7,787,088, now allowed which claims priority to Korean Patent Application No. 10-2004-0116898, filed Dec. 30, 2004, all of which are hereby incorporated by reference for all purposes as if fully set forth herein.

BACKGROUND OF THE INVENTION

1. Field of the Invention

The present invention relates to a liquid crystal display device and, more particularly, an in-plane switching mode liquid crystal display device and a fabrication method thereof that provide a fast response speed and an improved transmittance.

2. Discussion of the Related Art

As the information-oriented age is advancing, display devices for disposing and displaying information are actively being developed. More particularly, a flat panel display device, e.g., a liquid crystal display (LCD) device, having a small thickness, lightness weight and a low power consumption, has been actively studied. An LCD device uses optical anisotropy and birefringence characteristics of liquid crystal molecules in a liquid crystal layer to display images.

An LCD device may be an active matrix type liquid crystal display device having a thin film transistor and a pixel electrode connected to the thin film transistor arranged in a matrix manner. For example, an LCD device includes an upper substrate, a lower substrate, and a liquid crystal layer disposed between the upper and lower substrates. The upper substrate is referred to as a color filer substrate, and a lower substrate is referred to as an array substrate. When a driving voltage is supplied to a common electrode on the upper substrate and a pixel electrode on the lower substrate, a perpendicular electric field is formed between the common electrode and the pixel electrode. Because the liquid crystal molecules in the liquid crystal layer are thin and long, and have a pretilt angle, the pretilt angle is changed by the electric field. Thus, an arranging direction of the liquid crystal molecules is changed, thereby altering the optical anisotropic of the liquid crystal molecules and displaying images.

However, when the liquid crystal layer is driven by the perpendicular electric field, a transmittance and an aperture ratio increase but a viewing angle decreases. Accordingly, to solve this disadvantage, a driving method of liquid crystal by in-plane switching (IPS) using a horizontal electric field has been suggested.

FIG. 1 is a cross-sectional view illustrating an in-plane switching mode liquid crystal display device according to the related art. In FIG. 1, a liquid crystal panel of an in-plane switching mode liquid crystal display device includes a color filter substrate 9 having a color filter, an array substrate 10 having a thin film transistor facing the color filter substrate 9, and a liquid crystal layer 11 disposed between the color filter substrate 9 and the array substrate 10. A common electrode 17 and a pixel electrode 30 are disposed in parallel to each other on the array substrate 10, and a horizontal electric field L is formed by a difference in voltages supplied to the common electrode 17 and the pixel electrode 30. Thus, the in-plane switching mode liquid crystal display device is driven by using the horizontal electric field L to control liquid crystal molecules.

FIGS. 2A and 2B are cross-sectional views illustrating 'off' and 'on' states of the in-plane switching mode liquid crystal display device shown in FIG. 1. As shown in FIG. 2A, in an 'off' state, when no voltages are supplied to the common electrode 17 and the pixel electrode 30, no horizontal electric field is formed. Thus, all liquid crystal molecules 11 are aligned in the same direction.

As shown in FIG. 2B, in an 'on' state, when voltages are supplied to the common electrode 17 and the pixel electrode 30, the horizontal electric field L is formed. Locations of liquid crystal molecules 11a that are located corresponding to the common electrode 17 and the pixel electrode 30 remain unchanged by the horizontal electric field L. However, liquid crystal molecules 11b that are located between the common electrode 17 and the pixel electrode 30 become aligned in the same direction as the horizontal electric field L. Accordingly, the in-plane switching mode liquid crystal display device has a broad viewing angle, because the liquid crystal moves by the horizontal electric field. As a result, the in-plane switching mode liquid crystal display device may be viewed in direction of above/below/left/right of about 80° to 85° without a reversal process.

However, since the common electrode and the pixel electrode are formed on the same substrate in a pixel region, they shield the pixel region, thereby decreasing an aperture ratio. In addition, since a light quantity passing through the liquid crystal display device is limited, a brightness decreases.

In addition, the general liquid crystal display device (TN mode liquid crystal display device) and the in-plane switching mode liquid crystal display device use a twisted nematic liquid crystal. Since the twisted nematic liquid crystal has a response time over 30 ms (i.e., a slow response speed), the liquid crystal display device using a twisted nematic liquid crystal has a problem of low display quality in that an afterimage occurs when implementing an animation or fast movements. To improve these problem of the response speed, an FLC mode liquid crystal display device using a ferroelectric liquid crystal having a superior response property has been developed.

The ferroelectric liquid crystal is often referred to as a chiral smectic C liquid crystal having a response time below many ms. In other words, a response speed of the ferroelectric liquid crystal molecules is fast. In particular, each layer of the chiral smectic C liquid crystal is arranged with an angle. When an electric field is supplied to the chiral smectic C liquid crystal, a dipole moment is arranged in one direction, and a molecular alignment is uniform and maintained after the electric field is eliminated. Further, when an electric field is supplied in an opposite direction of the chiral smectic C liquid crystal, the molecular alignment may be reversed in an opposite direction at high speed. Thus, the molecular alignment of the ferroelectric liquid crystal differs according to a polarization of an electric field, and the FLC mode liquid crystal display device has a fast response property.

FIG. 3 is a cross-sectional view illustrating an FLC mode liquid crystal display device using a ferroelectric liquid crystal according to the related art. In FIG. 3, a liquid crystal panel 40 of an FLC mode liquid crystal display device includes a ferroelectric liquid crystal layer 80 in a gap d1 between a first alignment layer 55 on an array substrate 50 and a second alignment layer 75 on a color filter substrate 70. The ferroelectric liquid crystal layer 80 includes a plurality of ferroelectric liquid crystal molecules 82 arranged with an angle in the gap d1. The gap d1 is generally smaller than 2 µm.

Thus, the FLC mode liquid crystal display device has problems in that since the gap between the substrates is below 2 µm and since the ferroelectric liquid crystal molecules are in almost a gel state at a normal temperature, it is difficult to inject the ferroelectric liquid crystal molecules in the gap. In addition, because the gap is small, it is also difficult to provide a wider degree of control of the ferroelectric liquid crystal molecules using a supplied electric field.

SUMMARY OF THE INVENTION

Accordingly, the present invention is directed to an in-plane switching mode liquid crystal display device and a fabrication method thereof that substantially obviate one or more of the problems due to limitations and disadvantages of the related art.

An object of the present invention is to provide an in-plane switching mode liquid crystal display device and a fabrication method thereof that improve an aperture ratio and a transmittance.

Another object of the present invention is to provide an in-plane switching mode liquid crystal display device and a fabrication method thereof that improve a response speed, widen a viewing angle and increase brightness.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, an in-plane switching mode liquid crystal display device includes a first substrate including a pixel electrode in a pixel region, a second substrate facing the first substrate and including a common electrode, a first alignment layer on the pixel electrode, a second alignment layer on the common electrode, a first ferroelectric liquid crystal layer on the first alignment layer and including a first spontaneous polarization, a second ferroelectric liquid crystal layer on the second alignment layer and including a second spontaneous polarization, a rotational direction of the first ferroelectric liquid crystal layer with respect to the first alignment layer being different from a rotational direction of the second ferroelectric liquid crystal layer with respect to the second alignment layer, and a twisted nematic liquid crystal layer between the first and second ferroelectric liquid crystal layers.

In another aspect, a fabrication method of an in-plane switching mode liquid crystal display device includes forming a pixel electrode on a first substrate, forming a common electrode on a second substrate, forming a first alignment layer on the pixel electrode, forming a second alignment layer on the common electrode, forming a first ferroelectric liquid crystal layer on the first alignment layer, forming a second ferroelectric liquid crystal layer on the second alignment layer, exposing the first ferroelectric liquid crystal layer to a first atmosphere to generate a first spontaneous polarization, exposing the second ferroelectric liquid crystal layer to a second atmosphere different from the first atmosphere to generate a second spontaneous polarization, a rotational direction of the first ferroelectric liquid crystal layer with respect to the first alignment layer being different from a rotational direction of the second ferroelectric liquid crystal layer with respect to the second alignment layer, attaching the first and second substrates with the first and second ferroelectric liquid crystal layers facing each other, and forming a twisted nematic liquid crystal layer between the first and second ferroelectric liquid crystal layers.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE PREFERRED EMBODIMENTS

Reference will now be made in detail to the preferred embodiments of the present invention, examples of which are illustrated in the accompanying drawings.

In general, a ferroelectric liquid crystal has a permanent dipole moment in a particular direction even without an exterior electric field. One end of a ferroelectric liquid crystal director has a circle movement in one direction with another end of the ferroelectric liquid crystal director being fixed.

Figure 1:
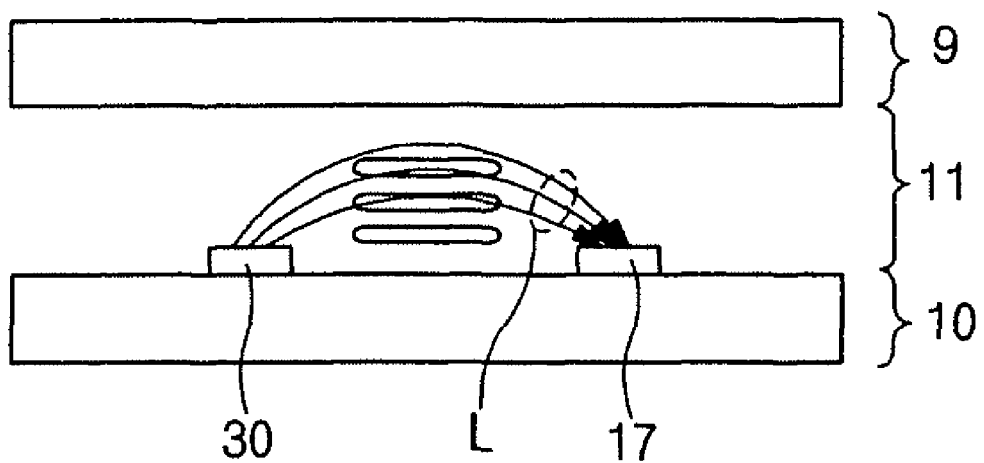
FIG. 1 is a cross-sectional view illustrating an in-plane switching mode liquid crystal display device according to the related art.
Figure 2A:
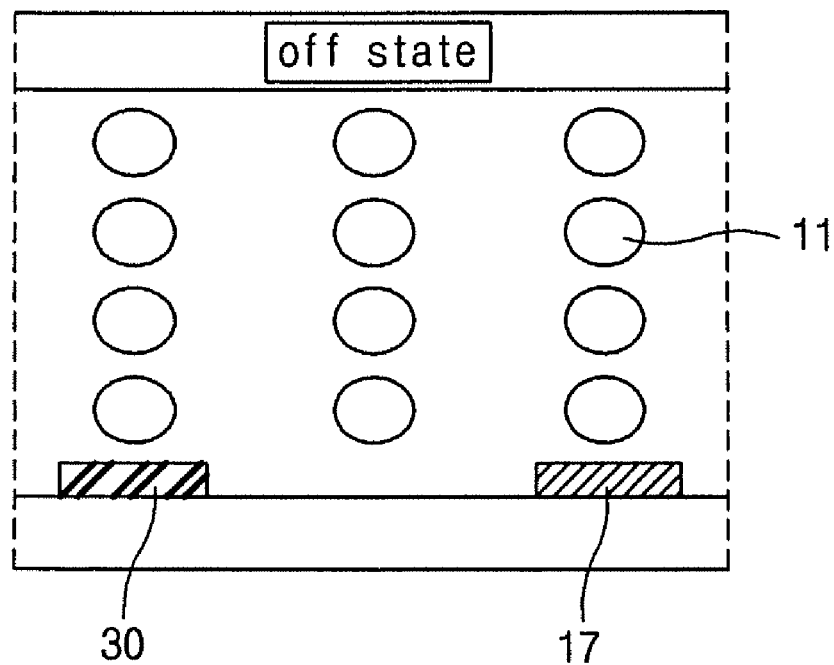
FIGS. 2A and 2B are cross-sectional views illustrating 'off' and 'on' states of the in-plane switching mode liquid crystal display device shown in FIG. 1.
Figure 2B:
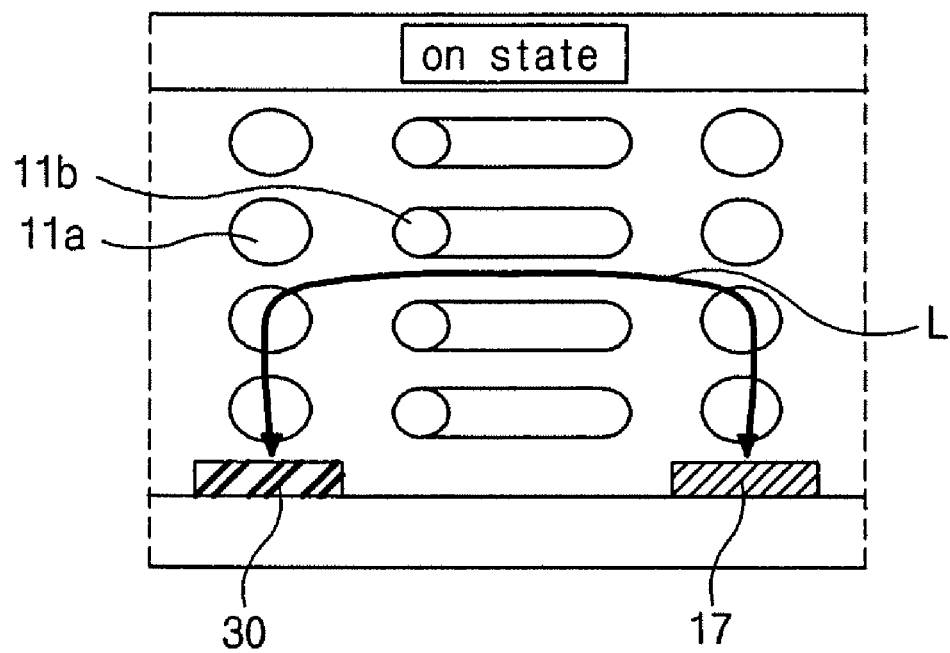
Figure 3:
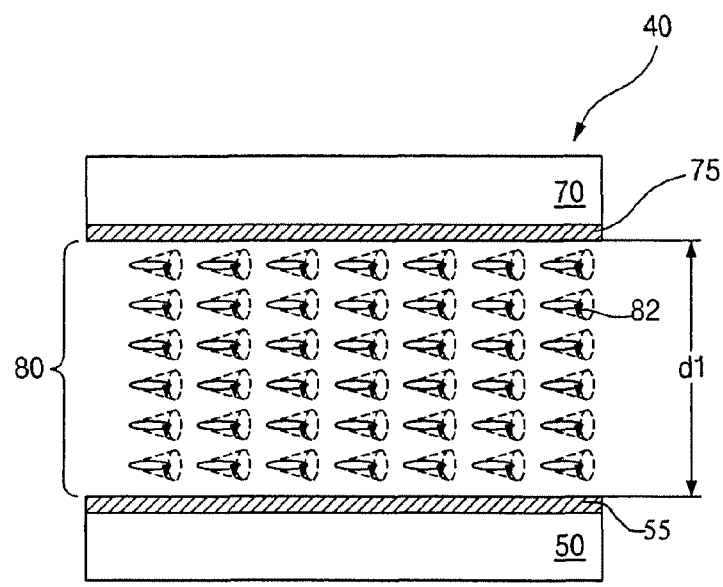
FIG. 3 is a cross-sectional view illustrating an FLC mode liquid crystal display device using a ferroelectric liquid crystal according to the related art.
Figure 4:
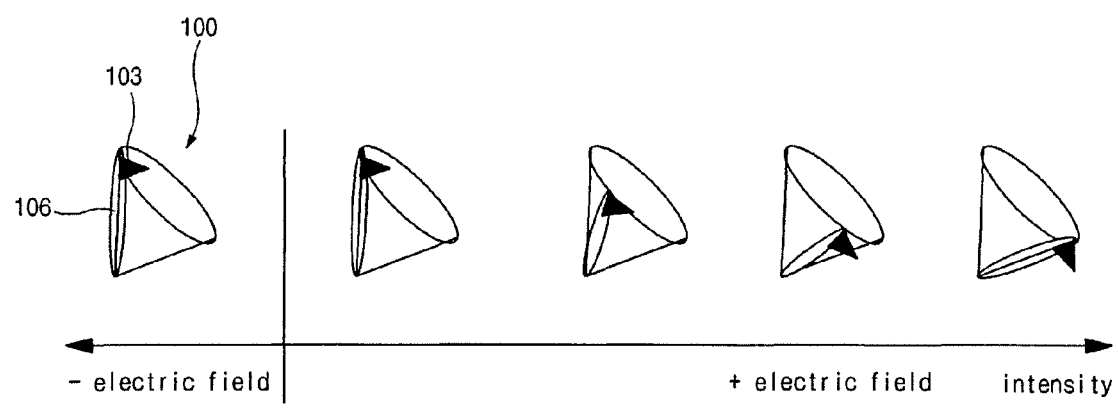
FIG. 4 is a view illustrating movements of ferroelectric liquid crystal directors by a supplied electric field.

FIG. 4 is a view illustrating movements of ferroelectric liquid crystal directors by a supplied electric field. As shown in FIG. 4, one end of a ferroelectric liquid crystal director 106 is fixed at an apex of a cone 100, which illustrates a movement locus of the ferroelectric liquid crystal director 106. Another end of the ferroelectric liquid crystal director 106 rotates in the one direction in a circumference phase of a spiral. For example, when an electric field is supplied, the ferroelectric liquid crystal director 106 rotates in the direction of a spontaneous polarization 103.

In general, a liquid crystal has a phase transition in accordance with a temperature. In other words, a ferroelectric liquid crystal has the following phase transitions: an isotropic phase transiting to a nematic phase (N*); the nematic phase (N*) transiting to a smectic phase (SmC*); and the smectic phase (SmC*) transiting to a crystal phase as the temperature changes from a high temperature to a low temperature. Further, a viscosity of the ferroelectric liquid crystal also changes according to the temperature. In other words, the viscosity is the lowest in the isotropic phase and the highest in the crystal phase. Accordingly, in order to form the ferroelectric liquid crystal on a substrate, the ferroelectric liquid crystal should be the isotropic phase state having the low viscosity and then be heated.

After a liquid crystal panel is formed, a phase used mainly in a normal temperature is smectic phase (SmC*), and a spontaneous polarization is revealed when the nematic phase (N*) transits to the smectic phase (SmC*). The spontaneous polarization controls a rotation of the liquid crystal director when a voltage is supplied thereto. When the liquid crystal director moves in the one direction by the spontaneous polarization, the rotation direction is continuously maintained.

In addition, when the ferroelectric liquid crystal made of the high molecular substance is used as a dynamic alignment layer made of a high molecular substance of a nematic liquid crystal, there is problems such that an adhesive strength from an interface and a rotatory power of the liquid crystal director decrease by an interaction of the high molecular substances. Accordingly, the ferroelectric liquid crystal according to an embodiment of the present invention has a stable alignment in the interface from the alignment layer since the ferroelectric liquid crystal is made of the monomolecular substance.

Figure 5A:
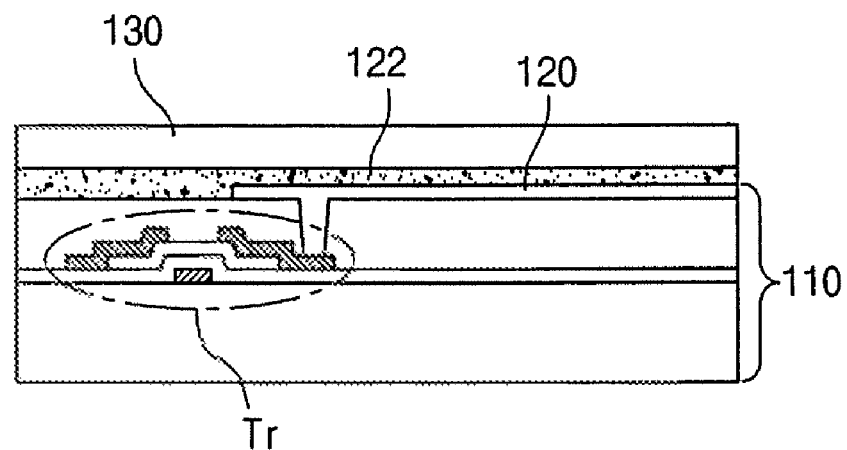
FIGS. 5A to 5C are cross-sectional views illustrating a process of forming a ferroelectric liquid crystal layer of an in-plane switching mode liquid crystal display device according to a first exemplary embodiment of the present invention.
Figure 5B:
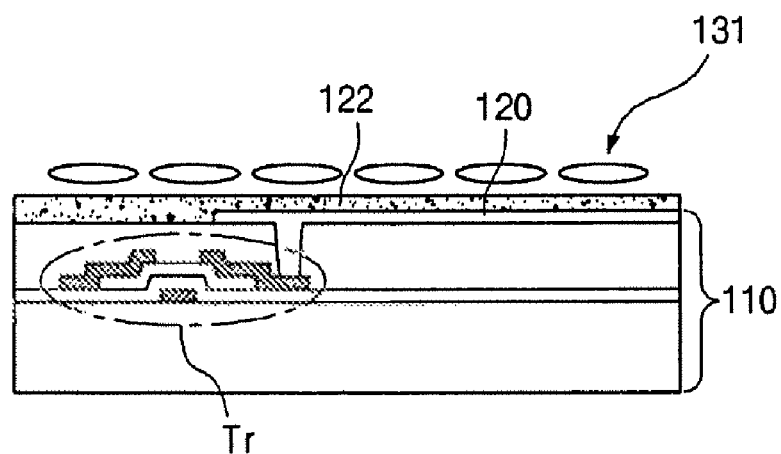
Figure 5C:
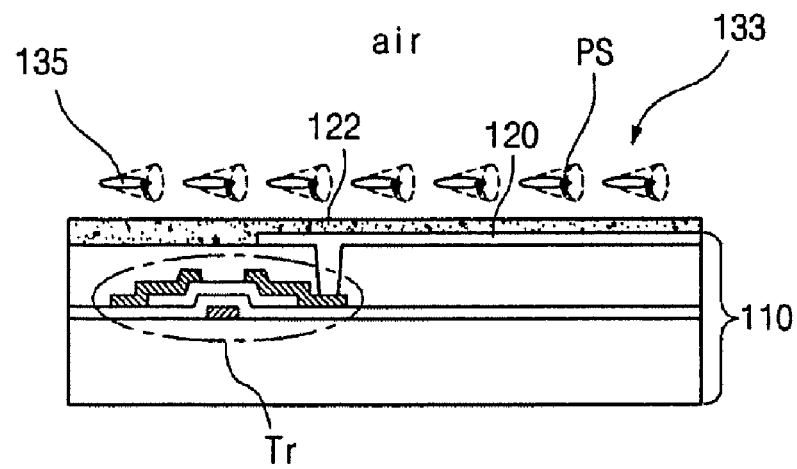

FIGS. 5A to 5C are cross-sectional views illustrating a process of forming a ferroelectric liquid crystal layer of an in-plane switching mode liquid crystal display device according to a first exemplary embodiment of the present invention. As shown in FIG. 5A, a polyimide (PI) of a high molecular substance is spread on an array substrate 110. The array substrate 110 includes a thin film transistor Tr and a pixel electrode 120, and may be subsequently attached to a color filter substrate (not shown) including red, green and blue color filters and a common electrode. The array substrate 110 further includes an alignment layer 122 on the thin film transistor Tr and the pixel electrode 120 for aligning a ferroelectric liquid crystal layer formed thereon.

A ferroelectric liquid crystal layer of an isotropic phase 130, which is made of a monomolecular substance and has a low viscosity by heating with a high temperature, is coated on the alignment layer 122 with a thickness of below 1 μm. For example, a thickness of about 1000 Å to 3000 Å may be coated on the alignment layer 122. The coating may be carried out by using a spin coating device (not shown) and a slit coating device (not shown) and may include adding a solvent for lowering the viscosity.

As shown in FIG. 5B, the ferroelectric liquid crystal layer of the isotropic phase 130 (shown in FIG. 5A) transits to a ferroelectric liquid crystal layer of a nematic phase (N*) 131 as the temperature decreases slowly. Further, as shown in FIG. 5C, the ferroelectric liquid crystal layer of the nematic phase (N*) 131 (shown in FIG. 5B) transits to a ferroelectric liquid crystal layer of a smectic phase (SmC*) 133 as the temperature further decreases.

When the ferroelectric liquid crystal layer of the nematic phase (N*) 131 transits to the ferroelectric liquid crystal layer of the smectic phases (SmC*) 133, by supplying + or − electric field or exposing to air, a spontaneous polarization PS having a rotational direction to the alignment layer is formed. In particular, the ferroelectric liquid crystal of the nematic phase (N*) 131 is contacted to the alignment layer 122, which is a polarity medium, instead of air, which is a non-polarity medium.

Since air is a non-polarity medium and the alignment layer i.e., polyimide (PI) is the polarity medium, the spontaneous polarization PS is revealed with direction of the polarity medium when the ferroelectric liquid crystal of the nematic phase (N*) transits to the ferroelectric liquid crystal of the smectic phase (SmC*). Further, since the spontaneous polarization PS has a high polarity, the liquid crystal molecules revealed the spontaneous polarization PS is arranged in the one direction. Also, when the + or − electric field is supplied, the ferroelectric liquid crystal director 135 rotates or is fixed while maintaining the direction by the spontaneous polarization PS revealed with direction to the alignment layer. When the polarization of the electric field accords with property of the revealed spontaneous polarization, the ferroelectric liquid crystal director rotates in the direction of the spontaneous polarization. When the polarization of the electric field differs with property of the revealed spontaneous polarization, the ferroelectric liquid crystal director is fixed.

A fabricating method of the array substrate and the color filter substrate of the liquid crystal display device having the ferroelectric liquid crystal of the smectic phase (SmC*) is the same as a fabricating method of general liquid crystal display device. For example, a sealant of adhesion may be formed on a rim of one of the array substrate and the color filter substrate, and then the two substrates having ferroelectric liquid crystal layers of the smectic phase (SmC*) are attached facing each other. Then, the twisted nematic liquid crystal is injected between the two substrates, and thus the in-plane switching mode liquid crystal display device is formed.

As the temperature changes from a high temperature to a low temperature, the twisted nematic liquid crystal has the following phase transitions: an isotropic phase transiting to a nematic phase (N*); the nematic phase (N*) transiting to a smectic phase (SmC*); and the smectic phase (SmC*) further transiting to a crystal phase. Since the twisted nematic liquid crystal has the nematic phase (N*) in the normal temperature and the ferroelectric liquid crystal has the smectic phase (SmC*) in the normal temperature, the twisted nematic liquid crystal and the ferroelectric liquid crystal are not mixed or fused.

Figure 6:
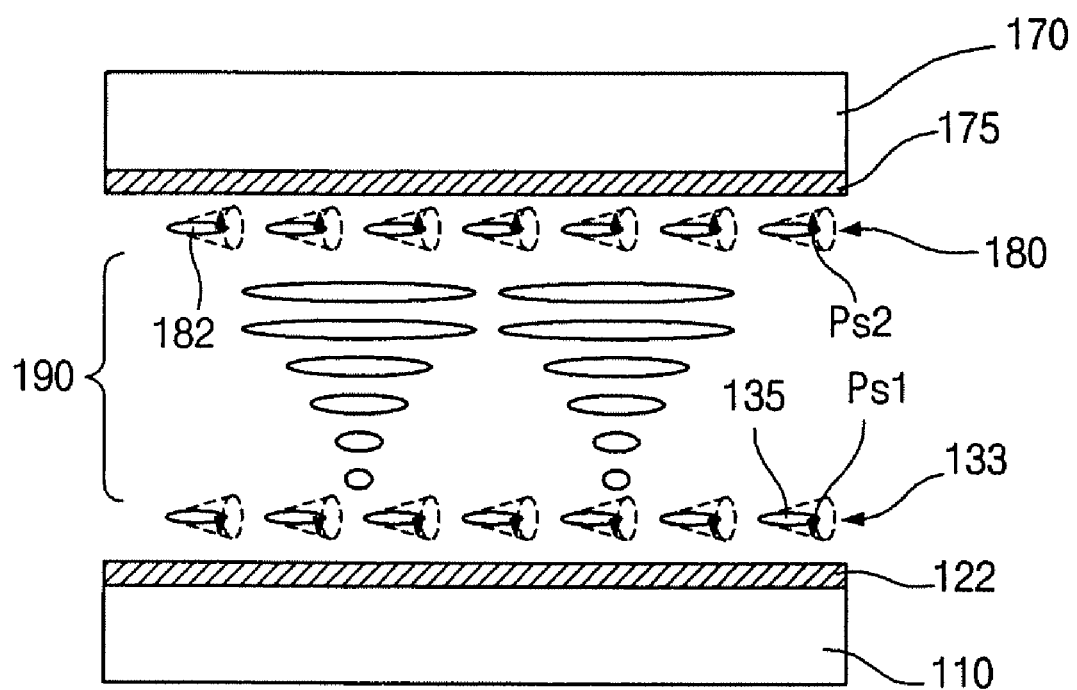
FIG. 6 is a cross-sectional view illustrating one pixel region of an in-plane switching mode liquid crystal display device according to the first exemplary embodiment of the present invention.

FIG. 6 is a cross-sectional view illustrating one pixel region of an in-plane switching mode liquid crystal display device according to the first exemplary embodiment of the present invention. Although not shown, a plurality of pixel regions are defined by crossing of data and gate lines on an array substrate 110, and a switching element and a pixel electrode connected the switching element are disposed in each pixel region. The array substrate 110 also includes a first alignment layer 122 disposed on the entire surface of the array substrate 110, and a first ferroelectric liquid crystal layer of smectic phase (SmC*) 133 disposed on the first alignment layer 122. The first ferroelectric liquid crystal layer of smectic phase (SmC*) 133 may have a thickness of about 1000 Å to 3000 Å. A first spontaneous polarization Ps1 of a liquid crystal director 135 in the first ferroelectric liquid crystal layer 133 rotates in the direction of the first alignment layer 122.

Although not shown, a plurality of color filter patterns, e.g., red, green and blue color filter patterns, are disposed on a color filter substrate 170 and corresponding to each pixel region. A black matrix (not shown) is disposed in a boundary of each color filter pattern, and a common electrode (not shown) is disposed on the color filter patterns and the black matrix. The color filter substrate 170 also includes a second alignment layer 175 on the common electrode (not shown), and a second ferroelectric liquid crystal layer of a smectic phase (SmC*) 180 disposed on the second alignment layer 175. The second ferroelectric liquid crystal layer of smectic phase (SmC*) may have a thickness of 1000 Å to 3000 Å and a thickness the same as the first ferroelectric liquid crystal layer of smectic phase (SmC*) 133. A spontaneous polarization Ps2 of a liquid crystal director 182 in the second ferroelectric liquid crystal layer 180 rotates in the direction of the second alignment layer 175.

In addition, a twisted nematic liquid crystal layer 190 is disposed between the first and second ferroelectric liquid crystal layers 133 and 180. The twisted nematic liquid crystal layer 190 moves according to a supplied electric field, with the first and second ferroelectric liquid crystal layers 133 and 180 acting as a dynamic alignment layer.

For example, as a perpendicular electric field is generated between the pixel electrode (not shown) of the array substrate 110 and the common electrode (not shown) of the color filter substrate 170, the first and second ferroelectric liquid crystal directors 135 and 182 in the first and second ferroelectric liquid crystal layers 133 and 180 are rotated by the perpendicular electric field. Simultaneously the first and second ferroelectric liquid crystal layers 133 and 180 rotate to left and right directions according to the rotation of the liquid crystal directors 135 and 182. As a result, the first and second ferroelectric liquid crystal layers 133 and 180 act as the dynamic alignment layer for the twisted nematic liquid crystal layer 190. As a result, the twisted nematic liquid crystal layer 190 moves as if the horizontal electric field is supplied. Accordingly, the in-plane switching mode liquid crystal display device according to an embodiment of the present invention has a broad viewing angle, and an increased brightness, without decreasing an aperture ratio.

The movement of the nematic liquid crystal according to supplied electric field will be explained in more detail. When a DC voltage is supplied to a liquid crystal for many times, a degradation occurs. Accordingly, in order to prevent this degradation, the liquid crystal display device makes a driving by changing a polarization of a supplied voltage periodically. In other words, an inverted voltage of + and − polarity periodically is supplied to the pixel electrode in accordance with the common electrode standardized. When the + and − polarity is reversely supplied, the director of the ferroelectric liquid crystal of smectic phase (SmC*) having a spontaneous polarization of a specific rotational direction rotates in the rotational direction of the spontaneous polarization when the direction of the spontaneous polarization accords with the polarity of the electric field. In addition, the director of the ferroelectric liquid crystal is fixed when the direction of the spontaneous polarization do not accord with the polarity of the electric field.

Accordingly, since the spontaneous polarization Ps2 of the second ferroelectric liquid crystal layer 180 and the spontaneous polarization Ps1 of the first ferroelectric liquid crystal layer 133 are facing the second alignment layer 175 and the first alignment layer 122, respectively, when + electric field (for one example, when a voltage of pixel electrode is high, a voltage of common electrode is low) is supplied, the liquid crystal director 182 in the second ferroelectric liquid crystal layer 175 of the color filter substrate 170 is fixed and the liquid crystal director 135 in the first ferroelectric liquid crystal layer 133 of the array substrate 110 rotates. As the first ferroelectric liquid crystal layer 133 rotates fast dynamically, the twisted nematic liquid crystal molecules located on near the first ferroelectric liquid crystal layer 133 rotate more fast than general rotational velocity of the twisted nematic liquid crystal, thus a response speed increases.

However, since the direction of the spontaneous polarization of the ferroelectric liquid crystal layer is opposite to each other, the in-plane switching mode liquid crystal display device according to the first exemplary of the present invention does not control fully a whole liquid crystal of the twisted nematic liquid crystal layer. Thus, the liquid crystal directors of the one ferroelectric liquid crystal layer are fixed without a rotation as when the voltage is not supplied, and the liquid crystal directors of another ferroelectric liquid crystal layer rotate when + or − electric field is supplied. Accordingly, an in-plane switching mode liquid crystal display device according to a second exemplary embodiment of the present invention offers such that the twisted nematic liquid crystal is more effectively controlled.

The second embodiment of the present invention has structure that both ferroelectric liquid crystal layers on an array substrate and a color filter substrate rotate when + or − electric field is supplied, in other words, the rotational direction of the two spontaneous polarizations accords. As explained in the first exemplary embodiment, the ferroelectric liquid crystal has a phase transition, in particular, the spontaneous polarization is revealed when the nematic phase (N*) is transit to the smectic phase (SmC*). When the spontaneous polarization is reveled, a direction of the spontaneous polarization is determined in the direction of a supplied electric field when + or − electric field is supplied, and in the direction of a polarity substance when a polarity substance and a non-polarity substance exist. Accordingly, the second exemplary embodiment has a more superior property of a response speed than the first exemplary embodiment, which has a structure that one liquid crystal director is fixed and another liquid crystal director rotates, thereby the ferroelectric liquid crystal layer having a structure that the both liquid crystal directors in the ferroelectric liquid crystal layers rotate in the one direction is formed.

Figure 7A:
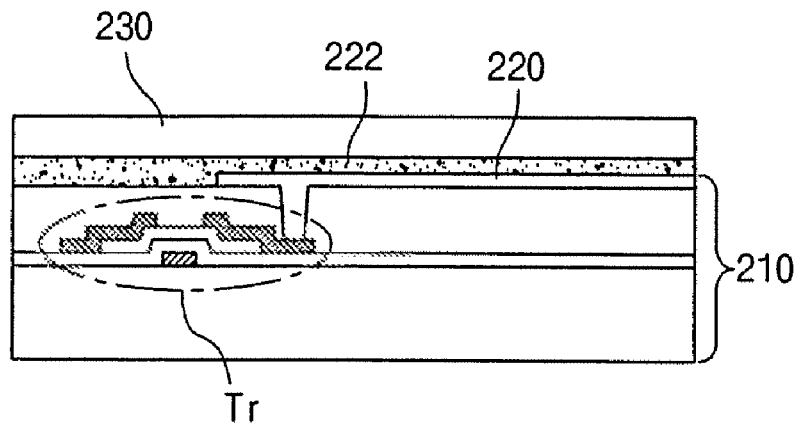
FIGS. 7A to 7C are cross-sectional views illustrating a process of forming a ferroelectric liquid crystal layer on an array substrate of an in-plane switching mode liquid crystal display device according to a second exemplary embodiment of the present invention.
Figure 7B:
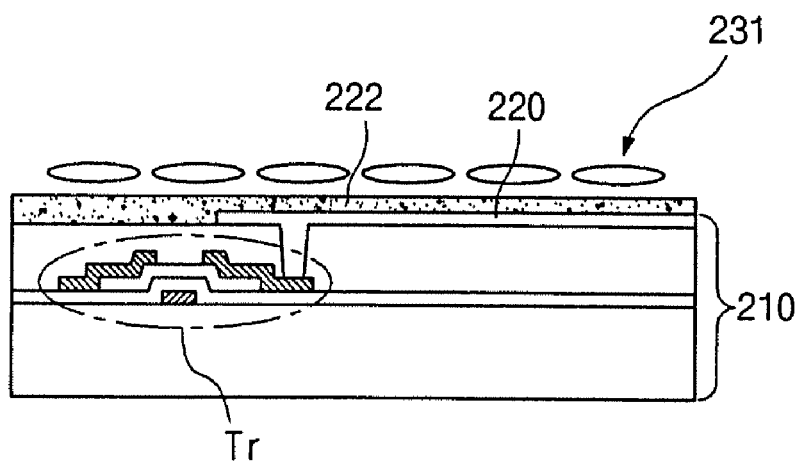
Figure 7C:
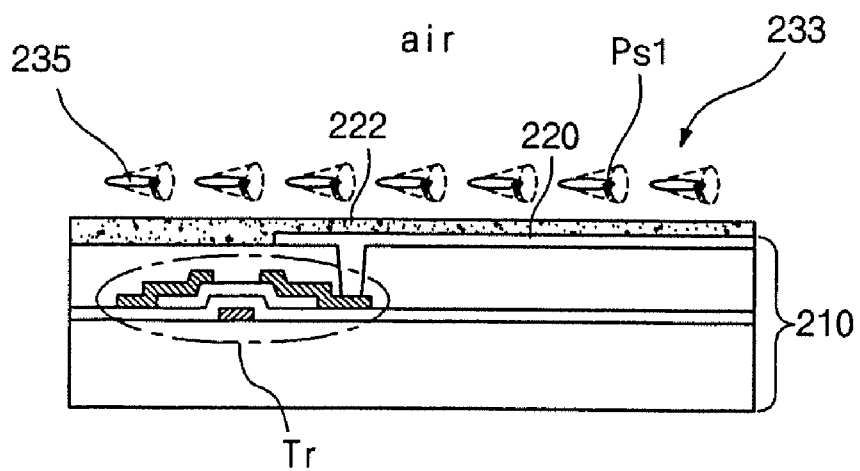

FIGS. 7A to 7C are cross-sectional views illustrating a process of forming a ferroelectric liquid crystal layer on an array substrate of an in-plane switching mode liquid crystal display device according to a second exemplary embodiment of the present invention. As shown in FIG. 7A, an array substrate 210 includes a thin film transistor Tr, a pixel electrode 220, and a first alignment layer 222 on the thin film transistor Tr and the pixel electrode 220. A first ferroelectric liquid crystal layer of an isotropic phase 230, which is made of a monomolecular substance and has a low viscosity by heating with a high temperature, is coated on the first alignment layer 222 with a thickness of below 1 μm. For example, a thickness of about 1000 Å to 3000 Å may be coated on the first alignment layer 222.

As shown in FIG. 7B, the first ferroelectric liquid crystal layer of the isotropic phase 230 (shown in FIG. 7A) transits to a ferroelectric liquid crystal layer of a nematic phase (N*) 231 as the temperature decreases slowly. Further, as shown in FIG. 7C, the ferroelectric liquid crystal layer of the nematic phase (N*) 231 (shown in FIG. 7B) transits to a ferroelectric liquid crystal layer of a smectic phase (SmC*) 233 as the temperature further decreases. A liquid crystal director 235 rotates in the direction of the first alignment layer 222 by revealing of a first spontaneous polarization Ps1.

Figure 8A:
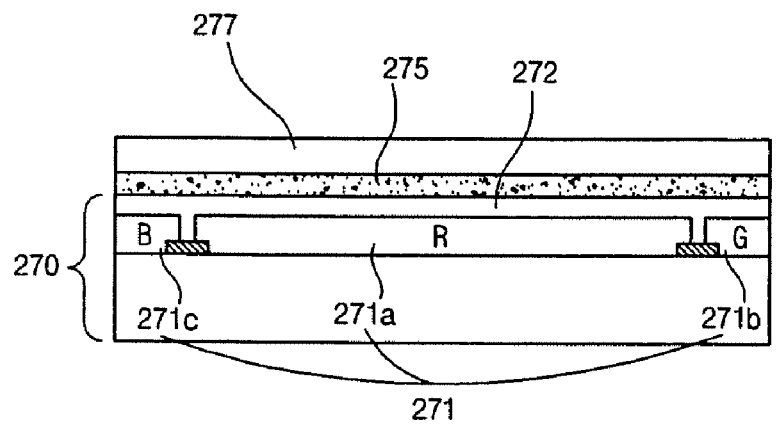
FIGS. 8A to 8C are cross-sectional views illustrating a process of forming a ferroelectric liquid crystal layer on a color filter substrate of an in-plane switching mode liquid crystal display device according to the second exemplary embodiment of the present invention.
Figure 8B:
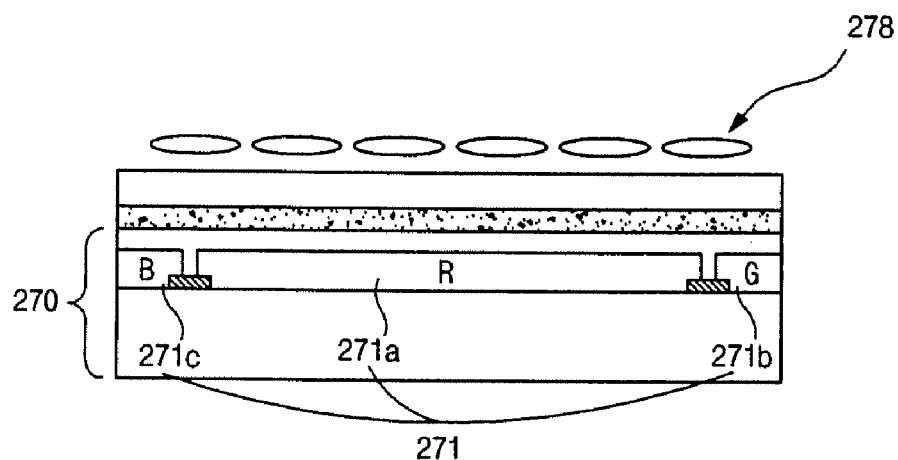
Figure 8C:
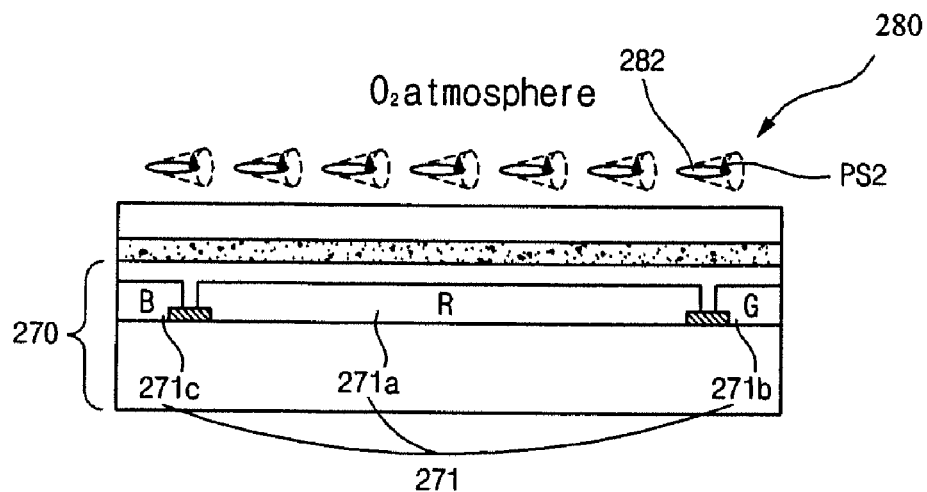

FIGS. 8A to 8C are cross-sectional views illustrating a process of forming a ferroelectric liquid crystal layer on a color filter substrate of an in-plane switching mode liquid crystal display device according to the second exemplary embodiment of the present invention. As shown in FIG. 8A, a color filter substrate 270 includes color filter layer 271, a common electrode 272, and a second alignment layer 275. The color filter layer 271 includes a plurality of red sub-color filter patterns 271a, green sub-color filter pattern 271b and blue sub-color filter patterns 271c. A second ferroelectric liquid crystal layer of an isotropic phase 277, which is made of a monomolecular substance and has a low viscosity by heating with a high temperature, is coated on the second alignment layer 275 with a thickness of below 1 μm. For example, a thickness of about 1000 Å to 3000 Å may be coated on the second alignment layer 275, and the thickness of the second ferroelectric liquid crystal layer of the isotropic phase 277 may be the same as the first ferroelectric liquid crystal layer of the isotropic phase 230 (shown in FIG. 7A).

As shown in FIG. 8B, the ferroelectric liquid crystal layer of the isotropic phase 277 (shown in FIG. 8A) transits to a ferroelectric liquid crystal layer of a nematic phase (N*) 278 as the temperature decreases slowly. Further, as shown in FIG. 8C, the ferroelectric liquid crystal layer of the nematic phase (N*) 278 (shown in FIG. 8B) transits to a ferroelectric liquid crystal layer of a smectic phase (SmC*) 280 as the temperature further decreases. A liquid crystal director 282 rotates in the direction of an O$_2$ atmosphere by revealing of a second spontaneous polarization Ps2.

When the ferroelectric liquid crystal layer of the nematic phase (N*) 278 transits to a ferroelectric liquid crystal layer of a smectic phase (SmC*) 280, an electric field is supplied on the ferroelectric liquid crystal layer. Alternatively, the ferroelectric liquid crystal layer is exposed in an atmosphere having higher polarity than the second alignment layer 275 made of polyimide (PI). For example, the ferroelectric liquid crystal of nematic phase (N*) 278 transits to the ferroelectric liquid crystal of the smectic phase (SmC*) 280 according to temperature decrease in an O$_2$ atmosphere, which has higher polarity than air. Accordingly, when the ferroelectric liquid crystal thereof is exposed in the O$_2$ atmosphere, the revealed spontaneous polarization Ps2 rotates in the direction of substance with the high polarity. As a result, contrary to the array substrate 210 (shown in FIG. 7C), which the direction of the first spontaneous polarization Ps1 faces to the first alignment layer 222, the direction of the second spontaneous polarization Ps2 faces to the O$_2$ atmosphere not to the second alignment layer 275.

Further, although not shown, a twisted nematic liquid crystal is disposed between the first and second ferroelectric liquid crystal layers of the array substrate (210 of FIG. 7C) and the color filter substrate (270 of FIG. 8C). Then, a patterned sealant is formed on a rim of one of the two substrates, and then the two substrates are attached each other. Accordingly, the in-plane switching mode liquid crystal display device according to the second exemplary embodiment of the present invention is formed.

Figure 9:
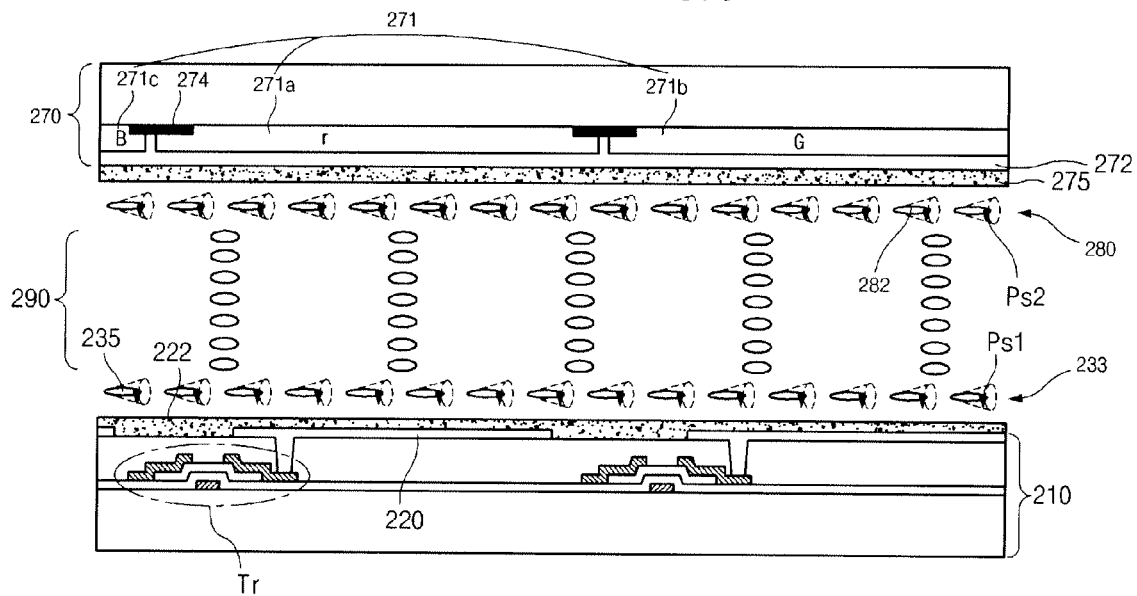
FIG. 9 is a cross-sectional view illustrating one pixel region of an in-plane switching mode liquid crystal display device according to the second exemplary embodiment of the present invention.

FIG. 9 is a cross-sectional view illustrating one pixel region of an in-plane switching mode liquid crystal display device according to the second exemplary embodiment of the present invention. As shown in FIG. 9, the rotational directions of the spontaneous polarizations Ps1, Ps2 with respect to the array substrate 210 and the color filter substrate 270, respectively, are opposite to each other. Accordingly, when the array substrate 210 and the color filter substrate 270 are attached facing each other, both the directions of the spontaneous polarizations Ps1, Ps2 face to the first alignment layer 222 of the array substrate 210. For example, the rotational directions of the rotational directions of the spontaneous polarizations Ps1, Ps2 may be both counter-clock wise when the array substrate 210 and the color filter substrate 270 are attached facing each other.

Thus, contrary to the first exemplary embodiment, the liquid crystal directors 235 and 282 in the first ferroelectric liquid crystal layer 233 of the array substrate 210 and the second ferroelectric liquid crystal layer 280 of the color filter substrate 270 rotate simultaneously in the same direction, e.g., one of clock wise and counter-clock wise, by the spontaneous polarizations Ps1, Ps2. Accordingly, the nematic liquid crystal molecules in the twisted nematic liquid crystal layer 290 used as the alignment layer of the two ferroelectric liquid crystal layers 233 and 280 rotate fast in the direction of rotation of the liquid crystal directors 235 and 282 in the first and second ferroelectric liquid crystal layers 233 and 280. The array substrate 210 includes a thin film transistor Tr, a pixel electrode 220, and a first alignment layer 222, and the color filter substrate 270 includes a black matrix 274, a color filter layer 271, which includes a plurality of red sub-color filter patterns 271a, green sub-color filter pattern 271b and blue sub-color filter patterns 271c, a common electrode 272 and a second alignment layer 275

As a result, the in-plane switching mode liquid crystal display device according to the second exemplary embodiment has a faster response speed than the related art, and further has a faster response speed and an more improved transmittance than the first exemplary embodiment fixed one of the first and second ferroelectric liquid crystal layers 133 and 180 of FIG. 6. Alternatively, the directions of the spontaneous polarizations Ps1, Ps2 may face to the second alignment layer of the color filter substrate, and thus it is obtained the same result that the directions of the spontaneous polarizations face to the first alignment layer.

Figure 10:
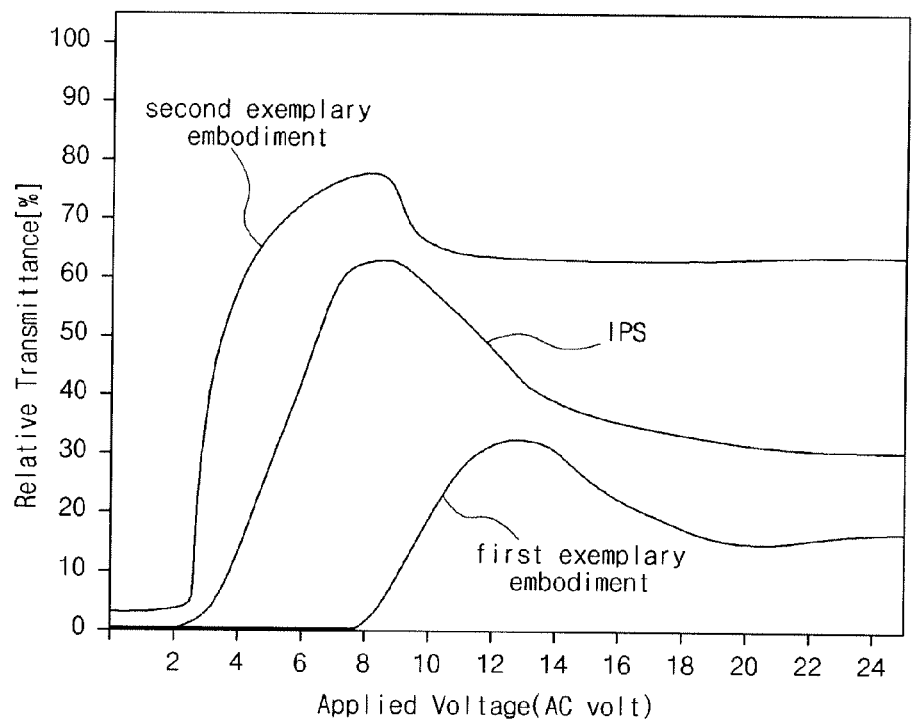
FIG. 10 is a graph illustrating a relation of a transmittance and a supplied voltage to an in-plane switching mode liquid crystal display device according to the related art and the first and second exemplary embodiments of the present invention.

FIG. 10 is a graph illustrating a relation of a transmittance and a supplied voltage to an in-plane switching mode liquid crystal display device according to the related art and the first and second exemplary embodiments of the present invention. As shown in FIG. 10, the in-plane switching mode liquid crystal display device according to the related art has a peak of transmittance of about 70% in 7V to 8V, while the in-plane switching mode liquid crystal display device according to the first exemplary embodiment of the present invention has a peak of transmittance of about 40% in 12V nearby. Thus, the transmittance according to the first exemplary embodiment versus related art decreases. However, the in-plane switching mode liquid crystal display device according to the second exemplary embodiment of the present invention has a peak of transmittance of about 80% in 7V to 8V. Thus, the transmittance according to the second exemplary embodiment versus related art increases.

It will be apparent to those skilled in the art that various modifications and variations can be made in the in-plane switching mode liquid crystal display device and the fabrication method thereof of the present invention without departing from the spirit or scope of the invention. Thus, it is intended that the present invention covers the modifications and variations of this invention provided they come within the scope of the appended claims and their equivalents.

What is claimed is:

1. A fabrication method of an in-plane switching mode liquid crystal display device, comprising:
   forming a pixel electrode on a first substrate;
   forming a common electrode on a second substrate;

forming a first alignment layer on the pixel electrode;
forming a second alignment layer on the common electrode;
forming a first ferroelectric liquid crystal layer on the first alignment layer;
forming a second ferroelectric liquid crystal layer on the second alignment layer;
exposing the first ferroelectric liquid crystal layer to a first atmosphere to generate a first spontaneous polarization;
exposing the second ferroelectric liquid crystal layer to a second atmosphere different from the first atmosphere to generate a second spontaneous polarization, a rotational direction of the first ferroelectric liquid crystal layer with respect to the first alignment layer being different from a rotational direction of the second ferroelectric liquid crystal layer with respect to the second alignment layer;
attaching the first and second substrates with the first and second ferroelectric liquid crystal layers facing each other; and
forming a twisted nematic liquid crystal layer between the first and second ferroelectric liquid crystal layers.

2. The method according to claim 1, wherein the first atmosphere includes air having a lower polarity than the first alignment layer, and the second atmosphere includes $O_2$ having a higher polarity than the second alignment layer.

3. The method according to claim 1, wherein the first atmosphere includes $O_2$ having a higher polarity than the first alignment layer, and the second atmosphere includes air having a lower polarity than the second alignment layer.

4. The method according to claim 1, wherein the first atmosphere includes a + electric field, and the second atmosphere includes a − electric field.

5. The method according to claim 1, wherein the first atmosphere includes a − electric field and the second atmosphere includes an a + electric field.

6. The method according to claim 1, wherein after attaching the first and second substrates, the rotational direction of the first spontaneous polarization is the same as the rotational direction of the second spontaneous polarization.

7. The method according to claim 1, further comprising:
setting a molecule alignment direction of the first ferroelectric liquid crystal layer to be the same as a molecule alignment direction of the second ferroelectric liquid crystal layer.

8. The method according to claim 1, wherein the forming the first ferroelectric liquid crystal layer and the second ferroelectric liquid crystal layer includes coating of a ferroelectric liquid crystal material of an isotropic phase using one of a bar coating device, a spin coating device and a slit coating device.

9. The method according to claim 8, wherein the coating further includes adding a volatile solvent in the ferroelectric liquid crystal of the isotropic phase to decrease a viscosity.

* * * * *